(12) United States Patent
Johnson

(10) Patent No.: US 6,253,708 B1
(45) Date of Patent: Jul. 3, 2001

(54) REMOTE CONTROLLED DRINKER SYSTEM AND DRINKER LINE CONTROL VALVE

(76) Inventor: Dwight N. Johnson, 6327 Chorlito Dr., Carlsbad, CA (US) 92008

( * ) Notice: Subject to any disclaimer, the term of this patent is extended or adjusted under 35 U.S.C. 154(b) by 0 days.

(21) Appl. No.: 09/386,186

(22) Filed: Aug. 31, 1999

(51) Int. Cl.⁷ .............................. A01K 39/02; F16K 15/00
(52) U.S. Cl. ........................ 119/72; 137/505.12; 251/331
(58) Field of Search ..................... 119/72, 74; 137/505, 137/505.12; 251/63, 331

(56) References Cited

U.S. PATENT DOCUMENTS

| | | | |
|---|---|---|---|
| 2,829,670 | * 4/1958 | Nix | 137/628 |
| 3,354,638 | * 11/1967 | Kersting | 137/505.12 |
| 4,896,629 | 1/1990 | Johnson | 119/72.5 |
| 5,186,208 | * 2/1993 | Hansen | 137/505.12 |
| 5,465,750 | * 11/1995 | Wang | 137/484.8 |
| 5,771,921 | 6/1998 | Johnson | 137/505 |
| 6,098,959 | * 8/2000 | Momont et al. | 119/72 X |

OTHER PUBLICATIONS

"ASCO® Red–Hat II™ 2,3 and 4 way Solenoid Valves", Automatic Switch Co., Florham Park, New Jersey, Catalog No. 32, pp. 60, 98–99.

"Regulation and Control of Liquids, Valves & Controls—Muesco™", Muesco, Inc., pp. 112.

\* cited by examiner

*Primary Examiner*—Robert P. Swiatek
(74) *Attorney, Agent, or Firm*—Mason, Kolehmainen, Rathburn & Wyss; Philip M. Kolehmainen

(57) ABSTRACT

A poultry drinker system includes a number of drinker runs each including a selector valve, a drinker line control valve and a drinker line having a plurality of drinkers. The selector valve applies to the corresponding drinker line control valve either an intermediate control pressure or a relatively high inlet pressure. Control pressure is derived from inlet pressure by an adjustable pressure reducing controller. In the absence of control pressure, a low pressure is applied to the drinker line control valves. Each drinker line control valve includes a proportional relay valve that is closed when low pressure is applied to the drinker line control valve and is open when intermediate pressure is applied to the drinker line control valve. When open, the proportional relay valve supplies to the corresponding drinker line a low pressure outlet flow proportional to control pressure. Each drinker line control valve includes a relief valve that is closed when low or intermediate pressure is applied to the drinker line control valve and is open when high pressure is applied to the drinker line control valve. When open, the relief valve supplies to the corresponding drinker line a high pressure rinse flow. The proportional relay valve and relay valve are integrated and share a common valve orifice and valve seat.

14 Claims, 3 Drawing Sheets

REMOTE CONTROLLED DRINKER SYSTEM AND DRINKER LINE CONTROL VALVE

FIELD OF THE INVENTION

The present invention relates to animal watering systems such as poultry drinker systems and more particularly to an improved remote controlled drinker system and drinker line control valve.

DESCRIPTION OF THE PRIOR ART

Drinker systems for supplying drinking water to poultry typically include an allay of drinker runs each including a dedicated pressure regulator supplying water to a drinker line having numerous drinker outlets such as nipple or cup drinkers. The dedicated regulator supplies water to the drinker line at a low pressure, typically less than one pound per square inch (PSI), and measured in inches of water column (WC, one PSI equals 28 inches WC). In a typical system, high pressure water is delivered from a common water supply to the dedicated pressure regulators of the colresponding drinker runs, and the dedicated pressure regulators reduce the inlet pressure and maintain a predetermined low pressure level in the drinker lines. The drinker runs including the drinker lines and pressure regulators are arrayed around the floor of a poultry building.

A spring in each regulator typically applies a force establishing the outlet pressure. The regulators are adjusted by changing the spring preload, but this requires the operator to go to each regulator and make the adjustment manually. The necessity for the operator to move around the poultry floor to each regulator location in sequence to perform adjustments is time consuming, inconvenient and undesirable. In addition, the presence of a person in the poultry building can disrupt the flock.

Periodically the drinker runs are flushed with higher pressure water to remove stale or contaminated water or to remove water containing residual medications or nutrients. In a typical drinker system, each drinker line is connected to a normally closed flush passage that bypasses the dedicated pressure regulator supplying that line. When a flush bypass passage is opened, high pressure water bypasses the regulator and flows directly into the corresponding drinker line and is discharged through an outlet weir. One disadvantage of this arrangement is that the flow passage through the regulator is not flushed when water flows through the bypass passage.

Manual control of the flushing operation requires the operator to move about the poultry floor opening and reclosing the bypass passages to flush the drinker lines in sequence. As noted above, movement of the operator around the poultry floor can be disturbing to the flock. In order to avoid the necessity for manually initiating a flushing operation at each regulator, the flushing operation may be accomplished from a remote location using electrically operated valves in the bypass passages. However, the bypass valves are located on the poultry floor with the drinker lines, and as a result this approach is expensive because in the harsh environment of the poultry house, the hardware including valves, wiring and electrical connectors must be highly corrosion resistant.

In order to avoid such difficulties, it has been proposed to remotely control dedicated drinker line regulators from a control valve stack or assembly at central location using air or fluid pressure control signals. The control signals are supplied to the dedicated regulators through control lines extending from the central location to the regulators on the poultry floor. Such a system is disclosed in pending U.S. patent application Ser. No. 09/130,217 filed on Aug. 8, 1998, now U.S. Pat. No. 5,967,167 issued on Oct. 19, 1999. The system disclosed in that patent has many important advantages. However, in some situations it might be considered a disadvantage to require a control valve stack or assembly at a central location and discrete ani pressure or fluid control lines extending from the central location to each drinker line regulator. To the extent that such disadvantages are a concern, it would be desirable to provide a drinker system that is controlled remotely without the need for control lines extending to the dedicated pressure regulators.

SUMMARY OF THE INVENTION

A principal object of the present invention is to provide an improved drinker system for animals such as poultry or the like. Other objects are to provide an improved drinker system with which the need for manual adjustments of dispersed system components is eliminated and the resulting inconvenience and on-floor disturbance is avoided; to provide a drinker system in which both normal drinker operation and periodic flush operations are controlled from a centralized remote location; to provide a drinker system in which drinker line control valves are remotely controlled without the necessity for providing additional control connections from a remote location to the drinker line control valves; to provide an improved drinker line control valve that is remotely controlled by variation of the inlet pressure supplied to the drinker line control valve; to provide an improved drinker line control valve in which both normal and flush operations are controlled with inlet pressure variations; and to provide a drinker system and drinker line control valve overcoming disadvantages of known systems and valves.

In brief, in accordance with the invention there is provided a drinker system for supplying dispersed low pressure drinker water from a high pressure water source. The system includes a plurality of drinker runs, each having a three-way selector valve, a drinker line having a plurality of drinkers and a control valve assembly between the selector valve and the drinker line. Each selector valve includes first and second selector valve inlets, an outlet connected to one of the control valve assemblies and selector means for connecting either the first or the second selector valve inlet to the selector output. A control pressure supply network is connected to the first selector valve inlets and a high pressure supply network is connected from the water source to the second selector valve inlets. A pressure reducing controller connected between the water source and the control pressure supply network supplies the control pressure supply network with water at a reduced control pressure. Each control valve assembly includes a proportional relay valve biased closed with a first, relatively weak spring for providing low pressure drinker water to the corresponding drinker line in response to the receipt of control pressure water from the corresponding the selector valve. Each control valve assembly includes a relief valve biased closed with a second, relatively strong spring for providing high pressure rinse water to the corresponding the drinker line in response to the receipt of high pressure water from the corresponding selector valve.

In accordance with another aspect of the invention, there is provided a drinker line control valve for use with a source of water having a range of supply pressures including lower, intermediate and higher pressure segments of the supply pressure range. The drinker line control valve alternatively supplies low pressure water to a drinker line and flushes the drinker line with high pressure water. The drinker line control valve includes a housing having an inlet adapted to be connected to the water source and an outlet adapted to be connected to the drinker line. A proportional relay valve in the housing includes a first, relatively weak spring biasing the proportional relay valve to a closed position. The first spring has a spring characteristic for holding the relay valve closed at inlet pressures in the lower pressure segment of the supply pressure range and for opening the relay valve to permit low pressure flow to the outlet at inlet pressures in the intermediate pressure segment of the supply pressure range. A relief valve in the housing includes a second, relatively strong spring biasing the relief valve to a closed position. The second spring has a spring characteristic for holding the relay valve closed at inlet pressures in the lower and intermediate pressure segments of the supply pressure range and for opening the relief valve to supply a flushing flow to the outlet at inlet pressure in the higher pressure segment of the supply pressure range.

BRIEF DESCRIPTION OF THE DRAWING

The present invention together with the above and other objects and advantages may best be understood from the following detailed description of the preferred embodiment of the invention illustrated in the drawings, wherein.

DETAILED DESCRIPTION OF THE PREFERRED EMBODIMENTS

Figure 1:
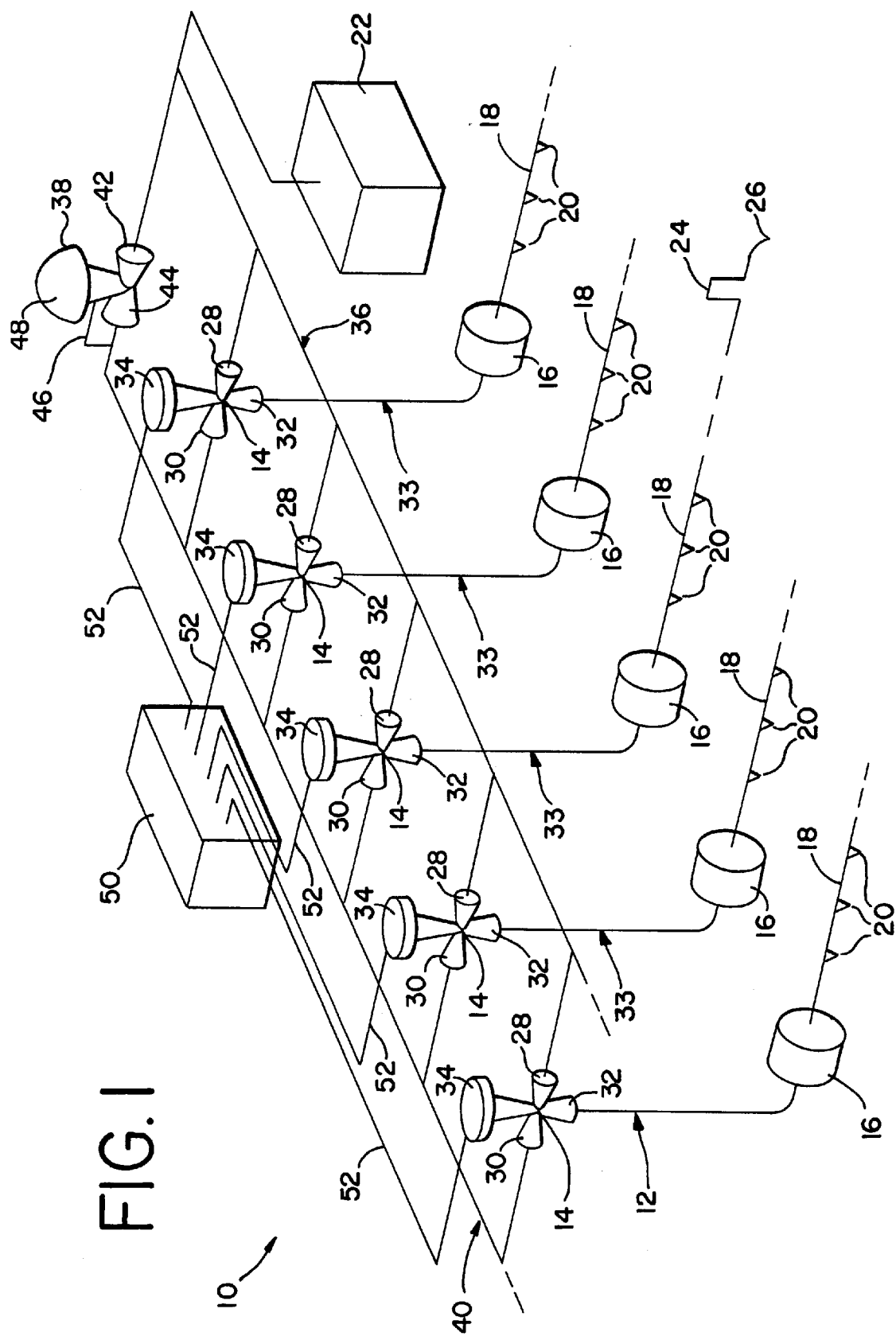
FIG. 1 is a schematic diagram of a drinker system embodying the present invention.

Having reference now to the drawings, in FIG. 1 there is illustrated a drinker system generally designated as 10 and constructed in accordance with the principles of the present invention. The illustrated drinker system 10 is a poultry watering system suitable for use as a floor bird system in a broiler house. The principles of the invention are applicable to other drinker systems such as cage bird systems and watering systems for other animals and livestock.

The drinker system 10 includes a number of drinker runs 12 each including a selector valve 14, a drinker line control valve 16 and a drinker line 18 having numerous drinkers 20 such as nipple or cup drinkers. The drinker lines 18 extend around the poultry floor of a poultry containing region or building. For example, in a typical 400 foot broiler house installation there may be eight drinker lines 18, each 200 feet in length and each having 200 nipple drinkers 20 at one foot intervals for a total of 1,600 nipple drinkers.

Water is supplied to the system 10 from a source 22 of relatively high pressure water, such as a local or municipal water supply system. Typically the source 22 supplies water to the system at a pressure in the range of about 20 to 30 PSI and has a flow capacity of, for example, 10 gallons per minute (GPM) or more. For normal operation of the drinkers 20, they are supplied by the system 10 with water at a relatively low pressure, for example less than 28 inches of water column (WC). Intermittently each drinker line 18 is flushed with water at a relatively high pressure of 20 PSI or more at a flow rate of, for example, 6 GPM. Each drinker line 18 terminates at an overflow weir 24 leading to a water discharge outlet 26 (one weir 24 and outlet 26 are shown in FIG. 1). The height of the weir 24 may be, for example, more than about 30 inches, in order to contain the relatively low pressure drinker supply water within the drinker lines 18 during normal operation, while permitting the flow of rinse water over the weir 24 to the outlet 26 during a rinse operation.

Each of the selector valves 14 is a three-way solenoid operated valve including a first inlet 28, a second inlet 30 and an outlet 32 connected by a conduit 33 to a corresponding drinker line control valve 16. A solenoid 34 is operated to alternatively connect the outlet 32 to either the first inlet 28 or the second inlet 30. The three-way selector valve may be of any known type and construction. An example of a suitable three-way selector valve is disclosed in a Catalog No. 32 of Automatic Switch Co. of Florham Park, N.J., entitled "ASCO RED-HAT II TM 2, 3 and 4 way Solenoid Valves". For a further disclosure of the three-way selector valve 14, reference may be had to the cover and pages 60, 98 and 99 of this catalog, which pages are placed on file with the filing of this application and incorporated by reference herein.

A high pressure water supply network 36 receives water at a relatively high pressure from the water source 22 and supplies water to each of the first inlets 28 of the selector valves 14. High pressure water is also supplied to a pressure reducing controller 38 that supplies water at a reduced, control pressure to the second inlets 30 of the selector valves 14 through a control pressure water supply network 40. The controller 38 has an inlet 42 communicating with the water source 22, an outlet 44, an outlet pressure feedback 46 and a pressure adjuster 48. The adjuster 48 may be remotely operated in any known manner or may be manually operated, and the controller 38 operates in response to the setting of the adjuster 48 and to the pressure feedback 46 to provide at the outlet 44 a regulated control pressure having an intermediate value lower than the relatively high inlet pressure from source 22 and greater than the relatively low pressure supplied to the drinker lines 12 in normal operation.

In the preferred embodiment, the pressure reducing controller is a known pressure reducing control valve such as that disclosed at page 112 of a catalog of Muesco, Inc. entitled "VALVES & CONTROLS". In this valve, the pressure adjuster is a threaded knob or the like that is rotated to vary the force of a spring acting on a diaphragm carrying a valve member and responsive to outlet pressure. The adjuster 48 can select a regulated control pressure in the range, for example, of from about five to about fifteen PSI. The cover page, title page and page 112 of this Muesco catalog are placed on file with the filing of this application and are incorporated by reference herein.

In order to operate any of the drinker runs 12 to produce a normal drinking operation, the selector valve 14 of that drinker run 12 is operated to interconnect the second inlet 30 to the outlet 32. As a result, reduced control pressure provided by the pressure reducing controller 38 is supplied through the control pressure network 40 and selector valve 14 to the corresponding drinker line control valve 16. As discussed below, the drinker line control valve 16 responds to application of this control pressure by maintaining a relatively low pressure in the drinker line 18 for operation of the drinkers 20.

Periodically, each drinker line 18 is rinsed with a higher pressure and higher volume flow. This is accomplished by operating the solenoid 34 of any selected drinker run 12 to interconnect the first inlet 28 to the outlet 32 of the corresponding selector valve 14. As seen in FIG. 1, a programmable controller 50 is connected to each solenoid 34 by an electrical connection 52. Alternatively the solenoids 34 could be operated by manual switching, or by a computer interfacing with the solenoids over a bus. Preferably the selector valves 14, solenoids 34 and connections 52 are located overhead, above the poultry floor to avoid environmental problems such as corrosion.

When one selector valve 14 is operated to connect the inlet 28 to the outlet 32, relatively high pressure water is communicated from the source 22 and high pressure water supply network 36 to the corresponding drinker line control valve 16. As discussed below, the drinker line control valve 16 responds to application of this relatively high pressure by applying a rinsing pressure flow in the drinker line 18 for rinsing of the drinker line.

Figure 2:
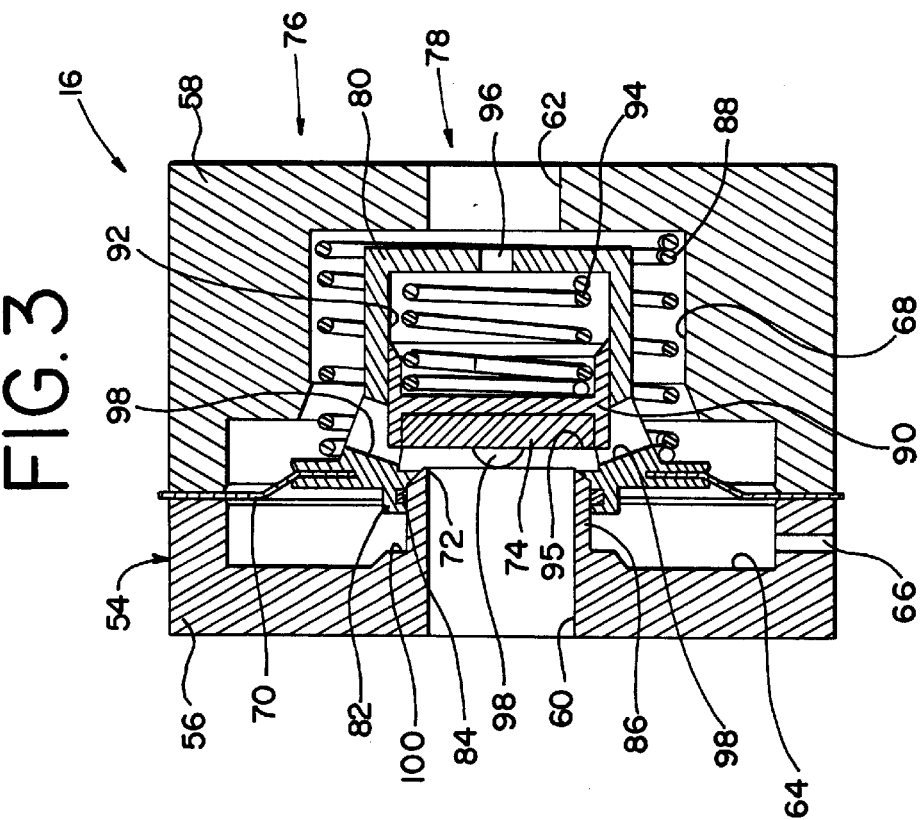
FIG. 2 is a cross sectional drawing of a drinker line control valve of the system of FIG. 1 shown in the closed condition.
Figure 3:
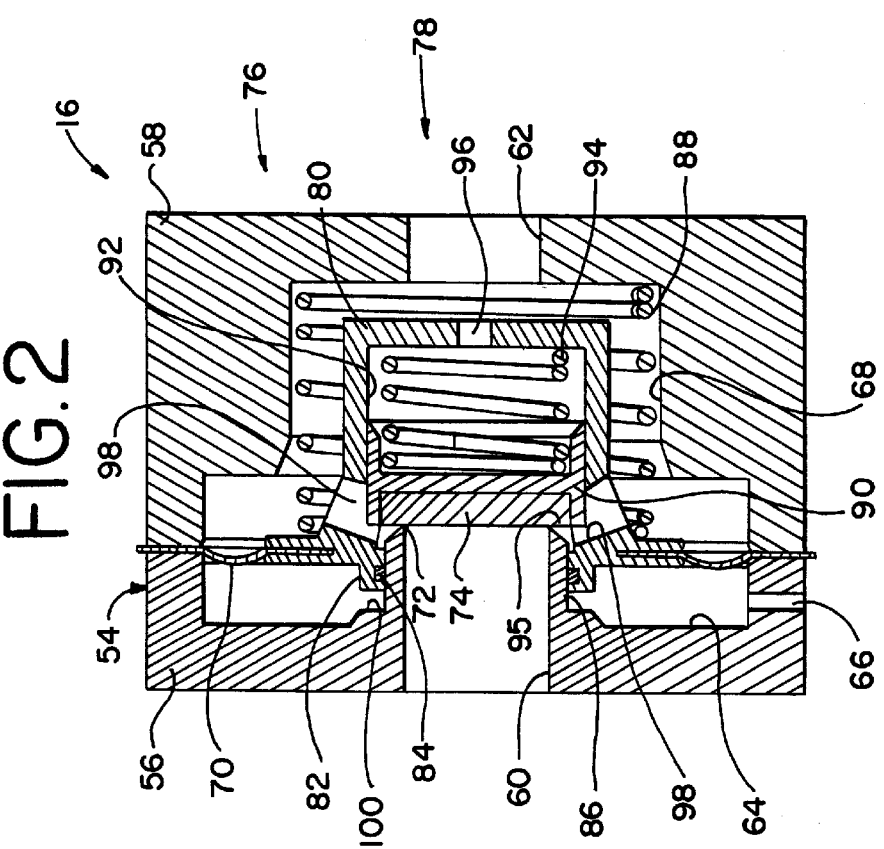
FIG. 3 is a drawing like FIG. 2 showing the drinker line control valve in an open condition in normal operation in which low pressure water is supplied to the drinker line.
Figure 4:
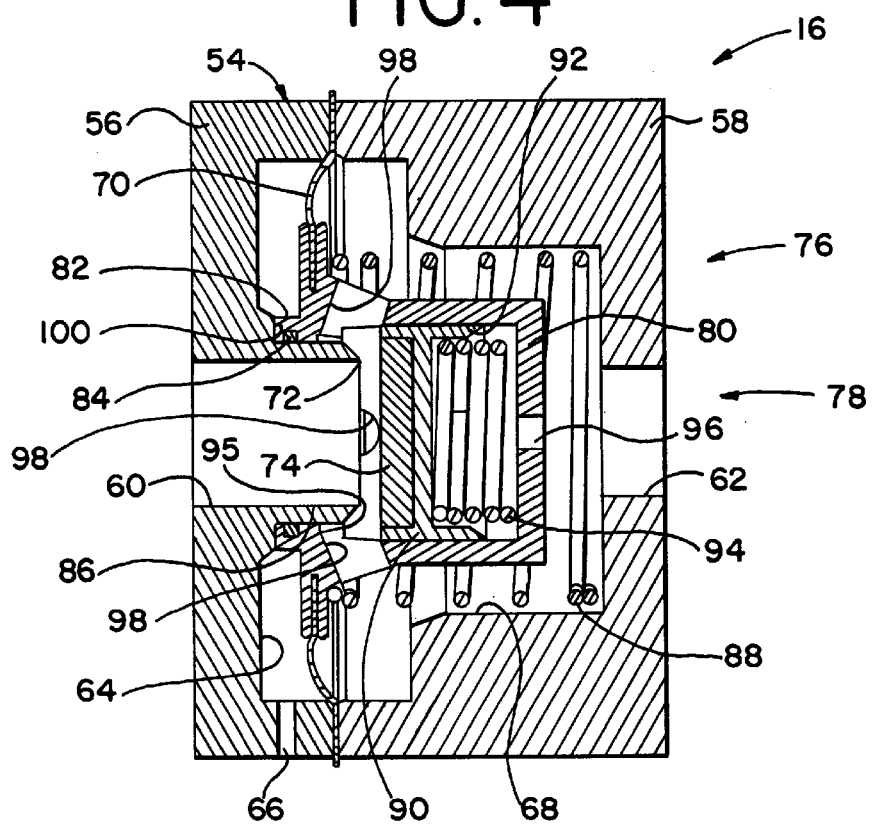
FIG. 4 is a drawing like FIGS. 2 and 3 showing the drinker line control valve in an open condition in a rinse operation in which high pressure water is supplied to the drinker line.

The drinker line control valve 16, illustrated in FIGS. 2–4, includes a housing 54 constituted of a body 56 and a cover 58. An inlet port 60 is formed in the body 56 and an outlet port 62 is formed in the cover 58. A vent chamber 64 in the body 56 is vented through a vent passage 66. An outlet chamber 68 in the cover 58 is exposed to the outlet pressure existing at the outlet port 62. A diaphragm 70 captured between the body 56 and the cover 58 is exposed to the pressure differential between the outlet chamber 68 and the vent chamber 64. The inlet port 60 extends to a valve orifice 72. A valve seat 74 cooperates with the orifice 72 to either prevent (FIG. 2) or permit (FIGS. 3 or 4) flow from the inlet port 60 to the outlet port 62 through the outlet chamber 68.

In accordance with the invention, the drinker line control valve 16 includes a proportional relay valve generally designated as 76 and a relief valve 78, both integrated into the drinker line control valve 16. The proportional relay valve responds to regulated control pressure supplied to the inlet port 60 by the selector valve 14 by providing a relatively low pressure, proportional to the inlet control pressure, to the drinker line 18 and drinkers 20. The relief valve 78 responds to relatively high pressure supplied to the inlet port 60 by the selector valve 14 by providing a relatively higher pressure rinse flow to the drinker line 18.

A cup-shaped piston 80 is carried by the diaphragm 70 and includes a central collar 82 supporting an O-ring seal 84 engaging a tube segment 86 of the body 56 surrounding and defining the inlet port 60 and orifice 72. The seal 84 maintains isolation of the outlet chamber 68 from the vent chamber 64. A spring 88 biases the piston 80 to the left as seen in FIGS. 2–4. The valve seat 74 is carried by a seat holder 90 slideably mounted in a cylindrical cavity 92 within the piston 80. A spring 94 is held in compression between the base of the cavity 92 and the seat holder 90. The spring 94 pre-loads the seat holder 90 and the valve seat 74 to the left as seen in FIGS. 2–4 against a stop shoulder 95 formed in the cavity 92 of the piston 80. The cavity 92 communicates with the outlet chamber 68 through a passage 96 in the base of the cavity 92.

The proportional relay valve 76 includes the orifice 72 and seat 74 together with the spring 88 and the seat holder 90, acting in unison with the piston 80. The spring 88 has a substantially smaller spring force than the spring 94. As a result, when the proportional relay valve 76 operates, the seat holder 90 does not move relative to the piston 80. Instead, these two components move as a unit in response to the control water pressure force applied within the inlet port 60 in opposition to the force applied by the spring 88 and the force of pressure in the outlet chamber 68.

An off or no flow position of the proportional relay valve 76 is shown in FIG. 2. In this position the spring 88 holds the seat 74 against the orifice 72 and prevents flow from the inlet port 60. The spring force of the spring 88 is selected to be sufficient to overcome any force resulting from pressure at the inlet port 60 caused by the weight of water in the conduits 33 and other pails of the system 10 in the absence of control pressure supplied by the pressure reducing controller 38. Control pressure can be discontinued, for example, by adjusting the controller to zero pressure, or by operating a suitable shut-off valve. In a preferred embodiment of the invention, the spring 88 in the off position of FIG. 2 applies a five pound closing force to the proportional relay valve 76.

When a control pressure having an intermediate pressure value is applied from the pressure reducing controller 38 through the selector valve 14 to the inlet port 60, the closing force applied by the spring 88 is overcome and the proportional relay valve 76 moves to an open position as illustrated in FIG. 3. In the preferred embodiment of the invention, the intermediate control pressure is in the range of from about 5 to about 15 PSI and is determined by the setting of the adjuster 48 of the pressure reducing controller 38. In the open position of FIG. 3, the seat holder 90 does not move relative to the piston 80. Rather, the piston 80 and seat holder 90 together with the seat 74 move as a unit away from the orifice 72 to permit flow from the inlet port 60 to the outlet port 62 through passages 98 extending radially through the piston 80.

Figure 5:
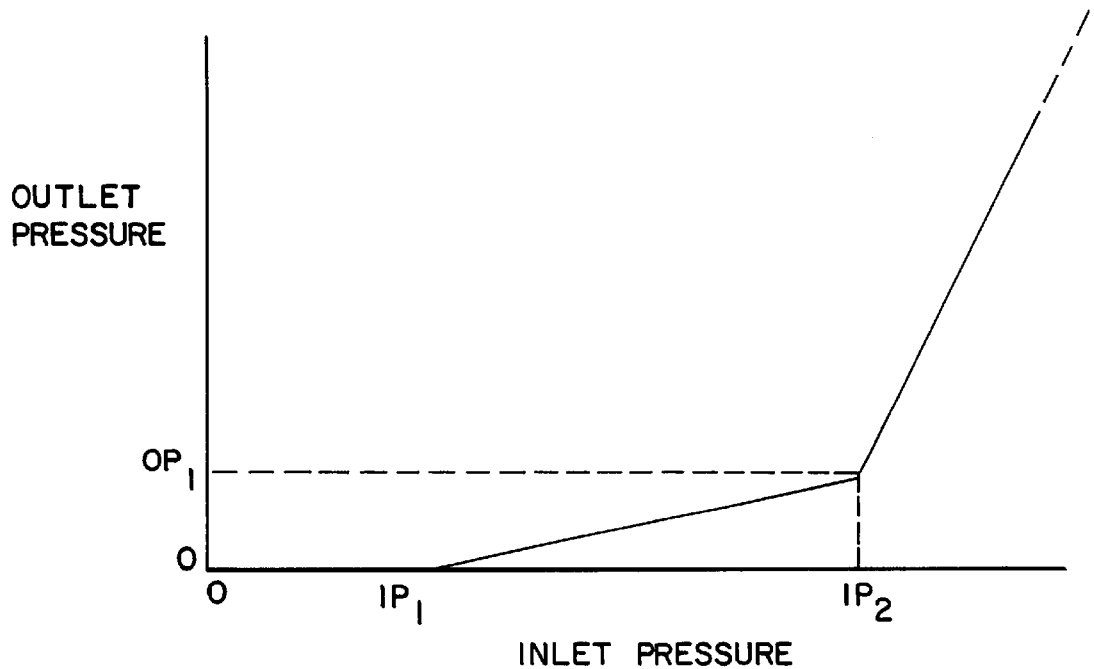
FIG. 5 is a graph showing the relationship between inlet and outlet water pressure in the drinker line control valve of FIGS. 2–5.

The area differential between pressure in the inlet port 60 and pressure in the outlet chamber 68 produces a relay operation and the pressure supplied in the outlet poll 62 is proportional to and smaller than the control pressure in the inlet port 60. In the preferred embodiment of the invention, the area circumscribed by the inlet valve orifice is one square inch, the area of the outlet chamber acting on the diaphragm 70 and piston 80 is ten square inches and the area differential is ten to one. As a result, the outlet pressure varies in the range of zero to one PSI (zero to 28 inches WC) as the inlet pressure varies in the range of 5 to 15 PSI The relationship between inlet pressure (horizontal axis) and outlet pressure (vertical axis) of the drinker line control valve 16 is graphically illustrated in FIG. 5. At inlet pressures in a low pressure range of from zero to an inlet pressure $IP_1$, the proportional relay valve 76 is held closed by the force applied by spring 88. In the preferred arrangement, the spring applies a five pound closing force and $IP_1$ is five pounds per square inch. In the operating range of the proportional relay valve 76, there is a linear ten to one relation between inlet and outlet pressure. As inlet pressure increases from IP, to a larger input pressure $IP_2$, outlet pressure increases proportionally from zero to an outlet pressure $OP_1$. In the preferred embodiment $OP_1$ is one PSI or 28 inches WC, a relatively low pressure range from which a desired drinker line pressure can be selected by operation of the adjuster 48.

The relief valve 78 includes the orifice 72 and seat 74 together with the spring 94 and the seat holder 90, now acting independently of the piston 80. The spring 94 has a substantially larger spring force than the spring 88. When a relatively high pressure is applied to the inlet port 60 from the water source 22 through the inlet 28 and outlet 32 of the selector valve 14, the spring 94 is compressed and the seat holder 90 with the seat 74 moves relative to the piston 80 and away from the orifice 74 to provide a rinse flow having a relatively large flow volume and a relatively high pressure.

The open or rinse flow position of the relief valve 78 is seen in FIG. 4. The seat 74 and seat holder 90 are spaced away from the orifice 72 permitting flow at a relatively high rate through the passages 98 and through the outlet chamber 68 to the outlet port 62. The relatively high outlet pressure water in the outlet pressure chamber 68 biases the diaphragm 70 and piston 80 to the left, and the piston collar 82 bottoms against a support flange 100 of the body 56. In the operating range of the relief valve 78, the piston 80 is fixed relative to the housing 54 while the movement of the seat 72 and seat holder 90 is controlled by the spring 94 and the difference between inlet and outlet pressure. A one to one linear relationship is maintained between inlet and outlet pressures by the relief valve 78.

In the preferred embodiment of the invention, the initial closing force provided by the spring 94 is fourteen pounds. The spring force is augmented by outlet pressure communicated through the passage 96 in the base of the piston 80. In the preferred embodiment, the relief valve 78 opens when the inlet pressure in the inlet port 60 exceeds fifteen PSI. Referring again to FIG. 5, when inlet pressure increases above $IP_2$, outlet pressure increases proportionally above $OP_1$. In the preferred arrangement, $IP_1$ is 15 PSI, $OP_1$ is one PSI and the proportional relationship is one to one. Thus, for example, at an input pressure of 20 PSI, the outlet pressure is six PSI. With a typical water source pressure of 20 to 30 PSI, the outlet pressure is in the range of 6 to 16 PSI and ample for performing a thorough drinker line rinse operation.

In operation of the system 10, the pressure reducing controller 38 is adjusted by the adjuster 48 to provide a desired control pressure in the intermediate pressure range of from 5 to 15 PSI. Normally all of the selector valves 14 are in their normal operating positions with the inlets 30 communicating with the outlets 32. Water at the selected control pressure is supplied through conduits 33 to the inlet ports 60 of the drinker line control valves 16. The proportional relay valves 76 supply the drinker lines 12 with a proportional, relatively low pressure in the range of up to 28 inches WC corresponding to the control pressure. For example, a control pressure of 10 PSI may be selected so that the proportional control valves 76 supply a drinker line pressure of one-half PSI or fourteen inches WC.

If the system 10 is shut down intentionally by discontinuing the control pressure, or unintentionally by loss of water pressure, the inlet pressure drops to the pressure resulting from gravity acting on water in the system 10 including the conduits 33. The vertical drop in the system may be, for an example, five feet, and in this case the gravity induced pressure is 60 inches or slightly more than 2 PSI. The five pound closing force of the springs 88 close all of the proportional relay valves 76 and discontinue all flow to the drinker lines 18.

A periodic flush cycle is performed under the control of the controller 50. Because the flow capacity of the water supply 22 is normally limited, the drinker lines IS are normally flushed in sequence rather than simultaneously. The controller 50 supplies sequential operating signals to the solenoids 34 over the connections 52. One selector valve 14 is operated to its alternate condition to connect the high pressure network 36 to the drinker line control valve 16 through the inlet 28 and outlet 32 of the selector valve 14. Application of relatively high inlet pressure from the source 22 to the inlet port 60 of the drinker line control valve 16 results in opening of the relief valve 78 and a relatively high pressure rinse flow is provided to the corresponding drinker line 18. The rinse flow pressure is determined by the inlet pressure. For example an inlet pressure of 25 PSI results in a rinse pressure of 11 PSI. The flush flow travels through the drinker line 18, over the weir 24 and out the discharge port 26, rinsing the entire drinker run flow path and removing stale and contaminated water from the drinker line 18. Because no bypass is used, the flow path through the drinker line control valve 16 is flushed as well.

At the end of the rinse operation, the controller 50 returns the selector valve to the normal position by a signal applied to the solenoid 34 through the electrical connection 52. The inlet 30 is again communicated to the outlet 42, and the relief valve 78 closes. The proportional relay valve 76 resumes normal operation to apply a relatively low pressure to the drinker run 12. Each drinker line 18 is flushed in a similar manner until the flush cycle is completed.

While the present invention has been described with reference to the details of the embodiment of the invention shown in the drawing, these details are not intended to limit the scope of the invention as claimed in the appended claims.

What is claimed is:

1. A drinker system for supplying dispersed low pressure drinker water from a high pressure water source, said system comprising:

a plurality of drinker runs, each including a three-way selector valve, a drinker line having a plurality of drinkers and a control valve assembly between said selector valve and said drinker line;

each said selector valve including first and second selector valve inlets, an outlet connected to one of said control valve assemblies and selector means for connecting either said first or said second selector valve inlet to said selector output;

a control pressure supply network connected to said first selector valve inlets;

a high pressure supply network connected from said water source to said second selector valve inlets;

a pressure reducing controller connected between the water source and said control pressure supply network for supplying said control pressure supply network with water at a reduced control pressure;

each said control valve assembly including a proportional relay valve biased closed with a first, relatively weak spring for providing low pressure drinker water to the corresponding said drinker line in response to the receipt of control pressure water from the corresponding said selector valve; and each said control valve assembly including a relief valve biased closed with a second, relatively strong spring for providing high pressure rinse water to the corresponding said drinker line in response to the receipt of high pressure water from the corresponding said selector valve.

2. A drinker system as claimed in claim 1, said selector valves being remotely operated.

3. A drinker system as claimed in claim 1, said selector valves being solenoid operated.

4. A drinker system as claimed in claim 1, said pressure reducing controller providing control pressure in an intermediate pressure range, said first spring having a spring characteristic for holding said relay valve closed at inlet pressures below said intermediate pressure range.

5. A drinker system as claimed in claim 4, said second spring having a spring characteristic for holding said relief valve closed at inlet pressures in said intermediate pressure range.

6. A drinker system as claimed in claim 1, said proportional relay valve and said relief valve being integrated into a single drinker line control valve.

7. A drinker system as claimed in claim 6, said drinker line control valve having a housing defining a single valve orifice, a single valve seat cooperating with said orifice, and said proportional relay valve and said relief valve sharing said valve orifice and said valve seat.

8. A drinker system as claimed in claim 7, said drinker line control valve including a pressure responsive diaphragm, a piston carried by said diaphragm, a seat holder in said piston, said piston being movable relative to said valve orifice, said seat holder holding said valve seat and being movable relative to said piston and relative to said valve orifice, said first spring biasing said piston toward said valve orifice and said second spring biasing said seat holder away from said piston and toward said valve orifice.

9. A drinker line control valve for use with a source of water having a range of supply pressures including lower, intermediate and higher pressure segments of the supply pressure range, the drinker line control valve alternatively supplying low pressure water to a drinker line and flushing the drinker line with high pressure water, said drinker line control valve comprising a housing having an inlet adapted to be connected to the water source;

said housing having an outlet adapted to be connected to the drinker line;

a proportional relay valve in said housing including a first, relatively weak spring biasing said proportional relay valve to a closed position;

said first spring having a spring characteristic for holding said relay valve closed at inlet pressures in the lower pressure segment of the supply pressure range and for opening said relay valve to permit low pressure flow to said outlet at inlet pressures in the intermediate pressure segment of the supply pressure range;

a relief valve in said housing including a second, relatively strong spring biasing said relief valve to a closed position;

said second spring having a spring characteristic for holding said relay valve closed at inlet pressures in the lower and intermediate pressure segments of the supply pressure range and for opening said relief valve to supply a flushing flow to said outlet at inlet pressure in the higher pressure segment of the supply pressure range.

10. A drinker line control valve as claimed in claim 9, said housing defining a single valve orifice, a single valve seat cooperating with said orifice, and said proportional relay valve and said relief valve sharing said valve orifice and said valve seat.

11. A drinker line control valve as claimed in claim 10, further comprising a pressure responsive diaphragm, a piston carried by said diaphragm, a seat holder in said piston, said piston being movable relative to said valve orifice, said seat holder holding said valve seat and being movable relative to said piston and relative to said valve orifice, said first spring biasing said piston toward said valve orifice and said second spring biasing said seat holder away from said piston and toward said valve orifice.

12. A drinker line control valve for use in a drinker system in series flow relationship between a water source supplying water at low, intermediate and high supply pressures and a drinker line including a plurality of drinkers, said drinker line control valve comprising:

a housing having an inlet port, an outlet chamber and an outlet port extending from said outlet chamber;

a movable pressure responsive member separating said inlet port and said outlet chamber;

a valve orifice between said inlet port and said outlet chamber;

a valve seat movable to close or open said valve orifice;

a piston carried by said pressure responsive member and movable toward and away from said valve orifice;

a seat holder supported by said piston and carrying said valve seat, said seat holder being movable relative to said piston;

a first spring biasing said piston toward said valve orifice with a force larger than the force of low supply pressure in said inlet port and smaller than the force of intermediate supply pressure in said inlet port;

said inlet port and said outlet chamber having an area differential for proportionally reducing outlet pressure relative to supply pressure in response to intermediate supply pressure in said inlet port;

a second spring biasing said seat holder toward said valve orifice and away from said piston with a force larger than the force of intermediate supply pressure in said inlet poll and smaller than the force of high supply pressure in said inlet port.

13. A drinker line control valve as claimed in claim 12, said pressure responsive member comprising a flexible diaphragm.

14. A drinker line control valve as claimed in claim 13, said housing defining a stop for limiting movement of said piston toward said valve orifice.

\* \* \* \* \*